US012764616B2

(12) United States Patent
Zhong et al.

(10) Patent No.: US 12,764,616 B2
(45) Date of Patent: Oct. 13, 2026

(54) TRANSMISSION SWITCHING METHOD, TERMINAL, AND NETWORK-SIDE DEVICE

(71) Applicant: VIVO MOBILE COMMUNICATION CO., LTD., Guangdong (CN)

(72) Inventors: Tingting Zhong, Guangdong (CN); Zhenhua Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 349 days.

(21) Appl. No.: 18/477,088

(22) Filed: Sep. 28, 2023

(65) Prior Publication Data

US 2024/0040447 A1 Feb. 1, 2024

Related U.S. Application Data

(63) Continuation of application No. PCT/CN2022/086151, filed on Apr. 11, 2022.

(30) Foreign Application Priority Data

Apr. 14, 2021 (CN) ......................... 202110400020.8

(51) Int. Cl.
*H04W 36/00* (2009.01)
*H04W 36/08* (2009.01)

(52) U.S. Cl.
CPC ... *H04W 36/0061* (2013.01); *H04W 36/0007* (2018.08); *H04W 36/0011* (2013.01); *H04W 36/08* (2013.01)

(58) Field of Classification Search
CPC ......... H04W 36/0061; H04W 36/0007; H04W 36/0011; H04W 36/08

(Continued)

(56) References Cited

U.S. PATENT DOCUMENTS

2013/0301509 A1* 11/2013 Purnadi ............. H04W 36/0033 370/312
2014/0078923 A1 3/2014 Guan et al.

(Continued)

FOREIGN PATENT DOCUMENTS

CN 101674526 A 3/2010
CN 104144456 A 11/2014

(Continued)

OTHER PUBLICATIONS

Huawei, HiSilicon. KI#1/KI#6: resolving EN in TR conclusion. 3GPP TSG-WG SA2 Meeting #143E. S2-2100712. Online. Feb.-Mar. 2021. 8 pages.

(Continued)

*Primary Examiner* — Joel Ajayi
(74) *Attorney, Agent, or Firm* — BROOKS KUSHMAN P.C.

(57) ABSTRACT

A transmission switching method, a terminal, and a network-side device are provided. The transmission switching method according to embodiments of this application includes: sending, by a source base station, a first indication to a network-side device, where the network-side device includes a target base station and/or a core network function, the first indication is used to request a terminal to hand over from the source base station to the target base station, the first indication contains service information of a first service, and the service information of the first service is used to determine whether the target base station is within or out of a service area corresponding to the first service.

12 Claims, 10 Drawing Sheets

(58) Field of Classification Search
USPC .......................................................... 455/437
See application file for complete search history.

(56) References Cited

U.S. PATENT DOCUMENTS

| | | | | |
|---|---|---|---|---|
| 2015/0223117 | A1* | 8/2015 | Jha .................... | H04W 36/0016 455/436 |
| 2016/0286439 | A1 | 9/2016 | Zhao et al. | |
| 2018/0035340 | A1 | 2/2018 | Fujishiro et al. | |

FOREIGN PATENT DOCUMENTS

| | | | |
|---|---|---|---|
| CN | 104602344 | A | 5/2015 |
| CN | 107182037 | A | 9/2017 |
| JP | 2014512766 | A | 5/2014 |
| JP | 2018164271 | A | 10/2018 |
| WO | 2020061347 | A1 | 3/2020 |

OTHER PUBLICATIONS

Huawei, HiSilicon. Clarification of the left issue on local MBS service. 3GPP TSG-SA2 Meeting # 149E. S2-2200884. Online. Feb. 2022. 10 pages.
LG Electronics. Clause 7.2.X.Y: Support of multicast service available within a limited area. Sa WG2 Meeting #144E. S2-2102339. Online. Apr. 2021. 3 pages.
Huawei, HiSilicon. Clarification of the local MBS service. 3GPP TSG-SA2 Meeting# 148E. S2-2109343. Online. Nov. 2021. 13 pages.
3rd Generation Partnership Project. Technical Specification Group Services and System Aspects; Study on architectural enhancements for 5G multicast-broadcast services (Release 17). 3GPP TR 23.757 V2.0.0. Online. Mar. 2021. 297 pages.
3rd Generation Partnership Project. Technical Specification Group Services and System Aspects; Architectural enhancements for 5G multicast-broadcast services; Stage 2; (Release 17) (Marked Revisions). 3GPP TS 23.247 V0.01.0. Online. Mar. 2021. 36 pages.
3rd Generation Partnership Project. Technical Specification Group Services and System Aspects; Architectural enhancements for 5G multicast-broadcast services; Stage 2; (Release 17). 3GPP TS 23.247 V0.1.0. Online. Mar. 2021. 35 pages.
European Search Report for Application No. 22787493.0, Aug. 21, 2024, 18 pages.
First Japanese Office Action for Japanese Patent Application No. 2023-559814 dated Sep. 26, 2024. 12 pages.
International Search Report and Written Opinion for Application No. PCT/CN2022/086151, dated Jun. 24, 2022, 9 Pages.
Lenovo, et. al. "Connected Mode Mobility with Service Continuity" 3GPP TSG-RAN WG2 Meeting #114e, Online, May 2021, R2-2105833, 5 Pages.
3GPP "3rd Generation Partnership Project; Technical Specification Group Services and System Aspects; Study on architectural enhancements for 5G multicast-broadcast services (Release 17)" 3GPP TR 23.757 V1.3.0 (Mar. 2021), 2021, 297 Pages. [Clean version: 23747-130_MCCclean.pdf].
3GPP "3rd Generation Partnership Project; Technical Specification Group Services and System Aspects; Study on architectural enhancements for 5G multicast-broadcast services (Release 17)" 3GPP TR 23.757 V1.3.0 (Mar. 2021), 2021, 299 Pages. [Marked version: 23747-130_RM r01.pdf].

* cited by examiner

TRANSMISSION SWITCHING METHOD, TERMINAL, AND NETWORK-SIDE DEVICE

CROSS-REFERENCE TO RELATED APPLICATIONS

This application is a continuation of PCT International Application No. PCT/CN2022/086151 filed on Apr. 11, 2022, which claims priority to Chinese Patent Application No. 202110400020.8 filed on Apr. 14, 2021, which are incorporated herein by reference in their entireties.

TECHNICAL FIELD

This application pertains to the field of wireless communications technologies, and specifically, relates to a transmission switching method, a terminal, and a network-side device.

BACKGROUND

The fifth generation (5th Generation, 5G) new radio (NR) technology can support services of various types or properties. A local multimedia broadcast and multicast service (Local MBS) is used as an example herein. The Local MBS service provides multicast or broadcast communication services only available for terminals within a local service area. In this case, if a terminal leaves the local service area, how the terminal is prevented from accessing services available only in the local service area is a problem that remains to be studied.

SUMMARY

Embodiments of this application provide a transmission switching method, a terminal, and a network-side device.

According to a first aspect, a transmission switching method is provided, which is executed by a source base station. The method includes: sending a first indication to a network-side device, where the network-side device includes a target base station and/or a core network function, the first indication is used to request a terminal to hand over from the source base station to the target base station, the first indication contains service information of a first service, and the service information of the first service is used to determine whether the target base station is within or out of a service area corresponding to the first service.

According to a second aspect, a transmission switching method is provided, which is executed by a target base station. The method includes: receiving a first indication from a source base station, where the first indication is used to request a terminal to hand over from the source base station to the target base station, the first indication contains service information of a first service, and the service information of the first service is used to determine whether the target base station is within or out of a service area corresponding to the first service.

According to a third aspect, a transmission switching method is provided, which is executed by a core network function. The method includes at least one of the following: receiving a first indication from a source base station, where the first indication is used to request a terminal to hand over from the source base station to a target base station, the first indication contains service information of a first service, and the service information of the first service is used to determine whether the target base station is within or out of a service area corresponding to the first service; receiving a third indication from the target base station, where the third indication is used to indicate that the terminal does not belong to a service group corresponding to the first service, and the third indication is sent in a case that the target base station receives the first indication from the source base station and that the target base station is out of the service area corresponding to the first service; and receiving a path switch request from the target base station, and sending a fourth indication to the target base station in a case that a second condition is met; where the fourth indication is used to indicate at least one of the following: a path switch corresponding to the first service failed; and the terminal does not belong to the service group corresponding to the first service.

According to a fourth aspect, a transmission switching method is provided, which is executed by a terminal. The method includes at least one of the following: receiving an RRC reconfiguration message from a source base station, where the RRC reconfiguration message is sent after the source base station sends a first indication to a network-side device, the first indication is used to request the terminal to hand over from the source base station to a target base station, the first indication contains service information of a first service, the service information of the first service is used to determine whether the target base station is within or out of a service area corresponding to the first service, and the network-side device includes the target base station and/or a core network function; receiving a fifth indication from the source base station, where the fifth indication is sent in a case that the source base station determines that the target base station is out of the service area corresponding to the first service, and the fifth indication is used to indicate that the terminal does not belong to a service group corresponding to the first service; and receiving a NAS message from the core network function, where the NAS message is used to indicate that the terminal does not belong to the service group corresponding to the first service.

According to a fifth aspect, a transmission switching apparatus is provided. The apparatus includes a first sending module, configured to send a first indication to a network-side device, where the network-side device includes a target base station and/or a core network function, the first indication is used to request a terminal to hand over from a source base station to the target base station, the first indication contains service information of a first service, and the service information of the first service is used to determine whether the target base station is within or out of a service area corresponding to the first service.

According to a sixth aspect, a transmission switching apparatus is provided. The apparatus includes a first receiving module, configured to receive a first indication from a source base station, where the first indication is used to request a terminal to hand over from the source base station to a target base station, the first indication contains service information of a first service, and the service information of the first service is used to determine whether the target base station is within or out of a service area corresponding to the first service.

According to a seventh aspect, a transmission switching apparatus is provided. The apparatus includes a third receiving module and the third receiving module is configured to perform at least one of the following: receiving a first indication from a source base station, where the first indication is used to request a terminal to hand over from the source base station to a target base station, the first indication contains service information of a first service, and the service information of the first service is used to determine whether the target base station is within or out of a service area corresponding to the first service; receiving a third indication from the target base station, where the third indication is used to indicate that the terminal does not belong to a service group corresponding to the first service, and the third indication is sent in a case that the target base station receives the first indication from the source base station and that the target base station is out of the service area corresponding to the first service; and receiving a path switch request from the target base station, and sending a fourth indication to the target base station in a case that a second condition is met; where the fourth indication is used to indicate at least one of the following: a path switch corresponding to the first service failed; and the terminal does not belong to the service group corresponding to the first service.

According to an eighth aspect, a transmission switching apparatus is provided. The apparatus includes a fourth receiving module and the fourth receiving module is configured to perform at least one of the following: receiving an RRC reconfiguration message from a source base station, where the RRC reconfiguration message is sent after the source base station sends a first indication to a network-side device, the first indication is used to request the terminal to hand over from the source base station to a target base station, the first indication contains service information of a first service, the service information of the first service is used to determine whether the target base station is within or out of a service area corresponding to the first service, and the network-side device includes the target base station and/or a core network function; receiving a fifth indication from the source base station, where the fifth indication is sent in a case that the source base station determines that the target base station is out of the service area corresponding to the first service, and the fifth indication is used to indicate that the terminal does not belong to a service group corresponding to the first service; and receiving a NAS message from the core network function, where the NAS message is used to indicate that the terminal does not belong to the service group corresponding to the first service.

According to a ninth aspect, a terminal is provided. The terminal includes a processor, a memory, and a program or instructions stored in the memory and capable of running on the processor. When the program or instructions are executed by the processor, the steps of the method according to the fourth aspect are implemented.

According to a tenth aspect, a terminal is provided, including a processor and a communication interface, where the communication interface is coupled to the processor, and the processor is used to run a program or instructions to implement the method according to the fourth aspect.

According to an eleventh aspect, a network-side device is provided. The network-side device includes a processor, a memory, and a program or instructions stored in the memory and capable of running on the processor. When the program or instructions are executed by the processor, the steps of the method according to the first aspect, or the steps of the method according to the second aspect, or the steps of the method according to the third aspect are implemented.

According to a twelfth aspect, a network-side device is provided, including a processor and a communication interface, where the communication interface is coupled to the processor, and the processor is configured to run a program or instructions to implement the steps of the method according to the first aspect, or the steps of the method according to the second aspect, or the steps of the method according to the third aspect.

According to a thirteenth aspect, a readable storage medium is provided. The readable storage medium stores a program or instructions, and when the program or instructions are executed by a processor, the steps of the method according to the first aspect, or the steps of the method according to the second aspect, or the steps of the method according to the third aspect, or the steps of the method according to the fourth aspect are implemented.

According to a fourteenth aspect, a chip is provided. This chip includes a processor and a communication interface, where the communication interface is coupled to the processor, and the processor is configured to run a program or instructions to implement the steps of the method according to the first aspect, or the steps of the method according to the second aspect, or the steps of the method according to the third aspect, or the steps of the method according to the fourth aspect.

According to a fifteenth aspect, a computer program product/program product is provided. The computer program product/program product is stored in a non-volatile storage medium, and the computer program product/program product is executed by at least one processor to implement the steps of the method according to the first aspect, or the steps of the method according to the second aspect, or the steps of the method according to the third aspect, or the steps of the method according to the fourth aspect.

In embodiments of this application, a source base station sends a first indication containing service information of a first service, so that a target base station and/or a core network function can determine, based on the service information of the first service, whether the target base station is within or out of a service area corresponding to the first service.

DETAILED DESCRIPTION

The following clearly describes the technical solutions in the embodiments of this application with reference to the accompanying drawings in the embodiments of this application. It is clear that the described embodiments are only some but not all of the embodiments of this application. All other embodiments obtained by persons of ordinary skill in the art based on the embodiments of this application shall fall within the protection scope of this application.

The terms “first”, “second”, and the like in this specification and claims of this application are used to distinguish between similar objects rather than to describe a specific order or sequence. It should be understood that the terms used in this way is interchangeable in appropriate circumstances so that the embodiments of this application can be implemented in other orders than the order illustrated or described herein, and “first” and “second” are usually for distinguishing same-type objects but not limiting the number of objects, for example, a first object may be one or multiple. In addition, “and/or” in this specification and claims indicates at least one of connected objects, and the symbol “/” generally indicates that the associated objects are in an “or” relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this application are usually used interchangeably. Techniques described herein may be used in the foregoing systems and radio technologies, and may also be used in other systems and radio technologies. In the following descriptions, an NR system is described for an illustration purpose, and the term NR is used in most of the following descriptions. However, these technologies may also be applied to other applications than an NR system application, for example, the sixth generation (6th Generation, 6G) communications system.

Figure 1A:
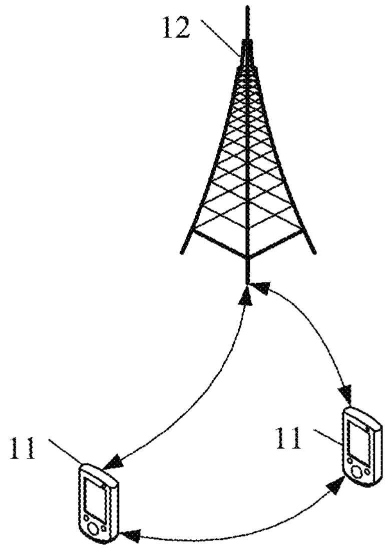
FIG. 1*a* is a schematic structural diagram of a wireless communications system according to an example embodiment of this application.

FIG. 1*a* is a schematic structural diagram of a wireless communications system to which embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

Figure 1B:
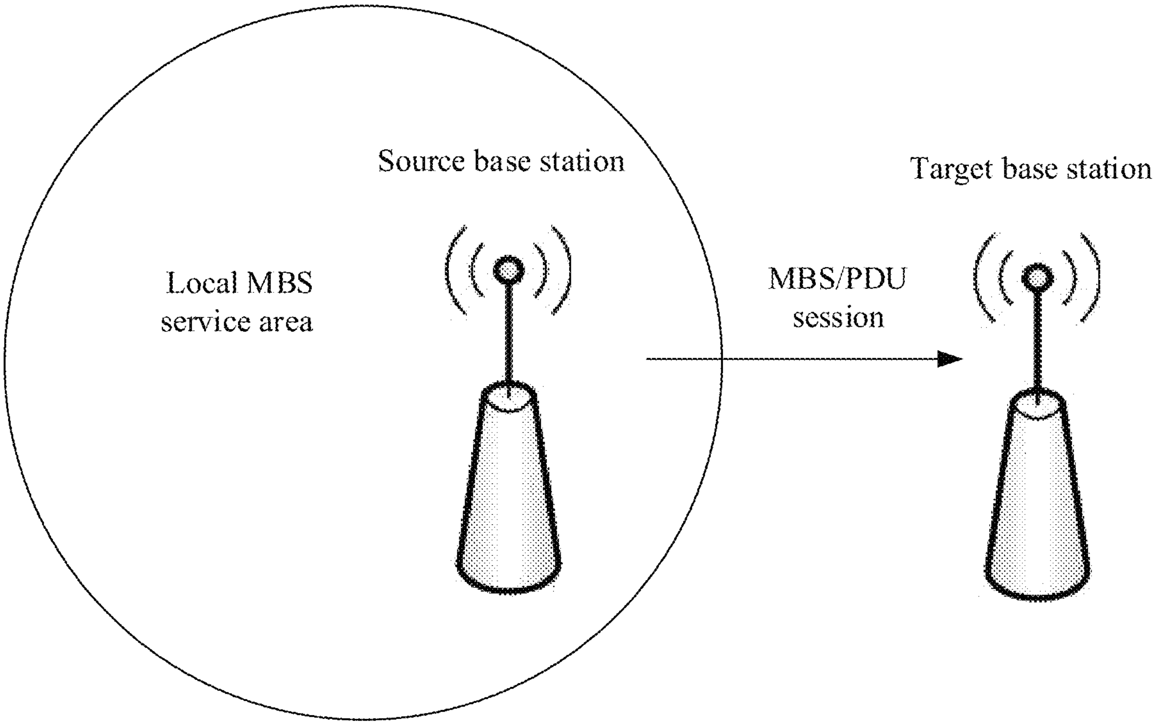
FIG. 1B is a schematic diagram of a transmission switching scenario according to an example embodiment of this application.

Furthermore, refer to FIG. 1B. A local MBS service in the NR is used as an example. A terminal leaves a service area corresponding to the Local MBS service, for example, the terminal is handed over from a source base station within the Local MBS service area to a target base station out of the Local MBS service area. Embodiments of this application provide a technical solution regarding how to determine whether the target base station is within or out of the service area of the Local MBS service and prevent the terminal out of the Local MBS service area from access to the Local MBS service in the Local MBS service area. The following will describe in detail the technical solution provided by the embodiments of this application with reference to accompanying drawings, embodiments, and application scenarios thereof.

Figure 2:
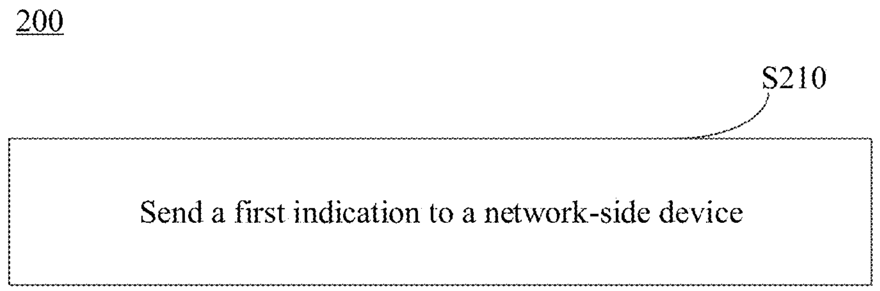
FIG. 2 is a schematic flowchart of a transmission switching method according to an example embodiment of this application.

FIG. 2 is a schematic flowchart of a transmission switching method 200 according to an example embodiment of this application. The method 200 may be executed by, but not limited to, a source base station, specifically hardware and/or software installed on the source base station. In this embodiment, the method 200 includes at least the following steps.

S210. Send a first indication to a network-side device.

Based on different handover scenarios, the network-side device includes a target base station (for example, a gNB) and/or a core network function. For an N2 handover scenario, the network-side device may include the core network function; for an XN handover scenario, the network-side device may include the target base station. The core network function may be an access and mobility management function (AMF), for example, an enhanced MBS capable AMF (MB-AMF) or the like, which is not limited herein.

The first indication is used to request a terminal to hand over from the source base station to the target base station, the first indication can contain service information of a first service, and the service information of the first service is used to determine whether the target base station is within or out of a service area corresponding to the first service.

The first service refers to: a multicast or broadcast communication service among vehicle-to-everything (V2X), public safety services, and other local services, which are possibly available only within a local service area (for example, per cell, timing advance (TA), or another geographical metric) during a specified period of time (for example, during an event, in emergency, or during operation), for example, at least one of Local MBS and MBS.

In this embodiment, the first indication may also be understood as a handover request indication. For example, based on different communication scenarios, the first indication may be a handover required message in the N2 handover scenario or a handover request message in the XN handover scenario. In an implementation, the source base station configures a terminal measurement process based on roaming and access control information contained in terminal context information, the terminal provides a measurement report based on the measurement configuration, and then the source base station makes a decision on transmission switching of the terminal based on the received measurement report and radio resource management (RRM) information. If a handover is required, the source base station sends a handover request indication; otherwise, the handover indication is not sent.

It should be noted that the source base station or the target base station may be a conventional base station or an enhanced base station. A difference between the conventional base station and the enhanced base station is that the enhanced base station is a network device with an MBMS (or MBS) capability, and can send MBMS (or MBS) data in a shared delivery mode on the core network portion. On the contrary, the conventional base station is a network device without the MBMS (or MBS) capability, and can only send MBMS or MBS through a protocol data unit session (PDU session) (or in an individual delivery mode on the core network portion). Based on this, actual types of the source base station and the target base station may be determined based on actual communication scenarios, which are not limited herein.

In this embodiment, a source base station sends a first indication containing service information of a first service, so that a target base station and/or a core network function can determine, based on the service information of the first service, whether the target base station is within or out of a service area corresponding to the first service. In this case, when a terminal leaves a local service area corresponding to the first service, it can be effectively triggered that the terminal is removed from a service group corresponding to the first service, and the first service is unavailable to the terminal, which guarantees features of Local MBS and other first services.

Figure 3:
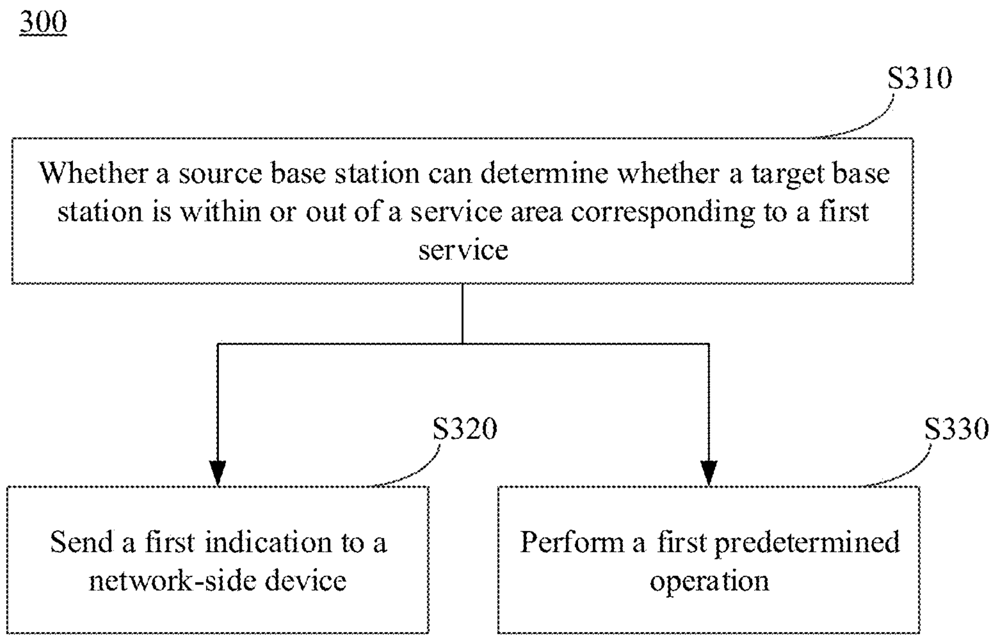
FIG. 3 is a schematic flowchart of a transmission switching method according to another example embodiment of this application.

As shown in FIG. 3, FIG. 3 is a schematic flowchart of a transmission switching method 300 according to an example embodiment of this application. The method 300 may be executed by a source base station or others, specifically hardware and/or software installed on the source base station. In this embodiment, the method 300 includes at least the following steps.

S310. Perform S320 if the source base station is uncertain whether the target base station is within or out of the service area corresponding to the first service, or perform S330 if the source base station is certain whether the target base station is within or out of the service area corresponding to the first service.

S320. Send a first indication to a network-side device.

It can be understood that an implementation process of S320 can be learned with reference to relevant descriptions in the method embodiment 200. To avoid repetition, details are not described herein again.

S330. Perform a first predetermined operation.

It can be understood that according to the description about the enhanced base station and conventional base station in the foregoing method embodiment 200: in this embodiment, if the source base station is a conventional base station, the source base station cannot determine whether the target base station is within or out of the service area corresponding to the first service. In this case, the source base station may perform S320 of sending a first indication to a network-side device, so that the network-side device determines, based on the first indication, whether the target base station is within or out of the service area corresponding to the first service.

If the source base station is an enhanced base station and it is determined that the target base station is out of the service area corresponding to the first service, the first predetermined operation in S330 is performed to ensure smooth transmission switching.

The first predetermined operation includes at least one of the following (1) to (3).

(1) Skip sending the first indication to the network-side device.

(2) Remove the service information of the first service from the first indication.

Regarding (1) and (2), it can be understood that the source base station can determine whether the target base station is within or out of the service area corresponding to the first service. Therefore, for the purpose of improving network performance and reducing network overheads, the source base station is not required to send the first indication, or only sends to the network-side device a first indication not containing service information of the first service for indicating a handover.

(3) Send a fifth indication to the terminal, where the fifth indication is used to indicate that the terminal does not belong to a service group corresponding to the first service. The service group may be, but is not limited to, a multicast service group corresponding to the MBS service.

In this embodiment, whether the source base station triggers the process of removing a terminal from the service group corresponding to the first service is determined based on whether the source base station can determine whether the target base station is within or out of the service area corresponding to the first service. This further improves the flexibility of transmission switching and guarantees features of Local MBS and other first services.

Figure 4:
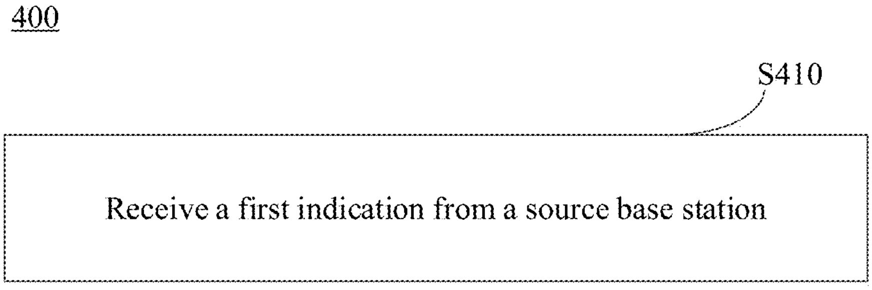
FIG. 4 is a schematic flowchart of a transmission switching method according to another example embodiment of this application.

As shown in FIG. 4, FIG. 4 is a schematic flowchart of a transmission switching method 400 according to an example embodiment of this application. The method 400 may be executed by a target base station or others, specifically hardware and/or software installed on the target base station. In this embodiment, the method 400 includes at least the following steps.

S410. Receive a first indication from a source base station.

The first indication is used to request a terminal to hand over from the source base station to the target base station, the first indication contains service information of a first service, and the service information of the first service is used to determine whether the target base station is within or out of a service area corresponding to the first service. Optionally, the first service includes at least one of Local MBS and MBS.

It can be understood that an implementation process of S410 can be learned with reference to relevant descriptions in the method embodiments 200 and 300. To avoid repetition, details are not described herein again.

In this embodiment, based on whether the target base station is a conventional or enhanced base station, the target base station can determine whether the target base station is within or out of the service area corresponding to the first service based on the service information of the first service contained in the first indication. Alternatively, the target base station may forward the service information of the first service to another network-side device (for example, a core network function), so that the another network-side device determines whether the target base station is within or out of the service area corresponding to the first service. In this way, transmission switching is implemented smoothly and the terminal can be removed from a service group corresponding to the first service.

Furthermore, in this embodiment, the target base station receives the first indication containing the service information of the first service. In a case that the source base station can determine whether the target base station is within or out of the service area corresponding to the first service, the first indication received by the target base station may not contain the service information of the first service, which is not limited in this embodiment.

In this embodiment, a target base station receives a first indication containing service information of a first service, so that the target base station and/or a core network function can determine, based on the service information of the first service, whether the target base station is within or out of a service area corresponding to the first service. In this case, when a terminal leaves a local service area corresponding to the first service, it can be effectively triggered that the terminal is removed from a service group corresponding to the first service, and the first service is unavailable to the terminal, which guarantees features of Local MBS and other first services.

Figure 5:
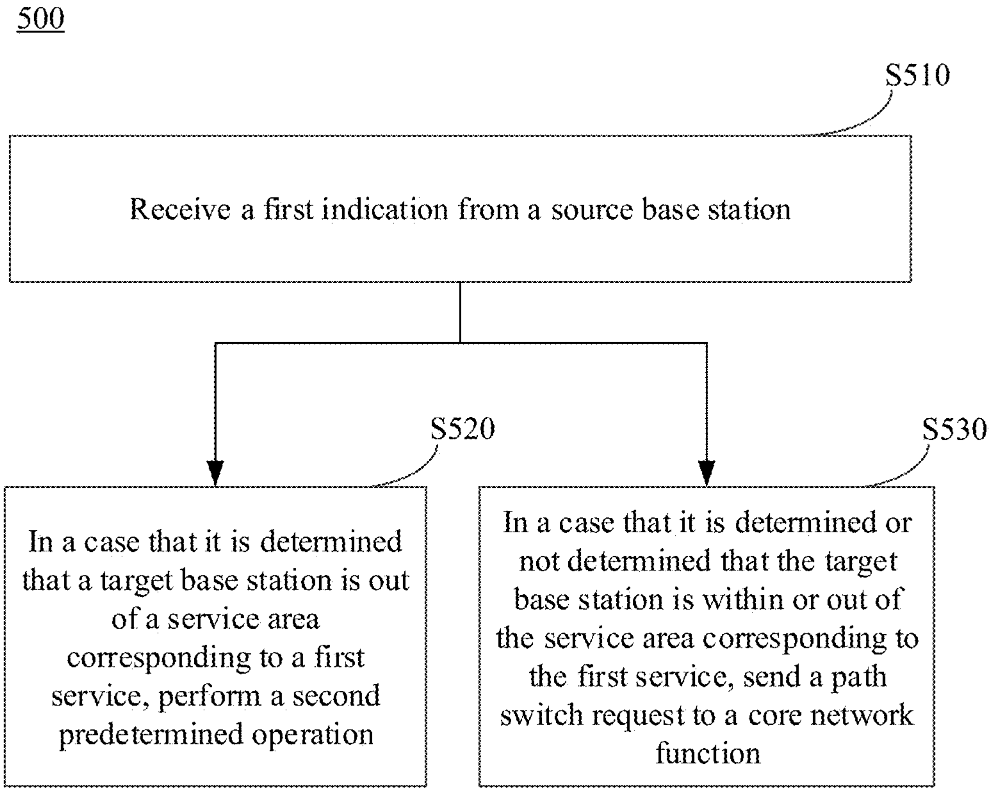
FIG. 5 is a schematic flowchart of a transmission switching method according to another example embodiment of this application.

As shown in FIG. 5, FIG. 5 is a schematic flowchart of a transmission switching method 500 according to an example embodiment of this application. The method 500 may be executed by a target base station or others, specifically hardware and/or software installed on the target base station. In this embodiment, the method 500 includes at least the following steps.

S510. Receive a first indication from a source base station.

The first indication is used to request a terminal to hand over from the source base station to the target base station, the first indication contains service information of a first service, and the service information of the first service is used to determine whether the target base station is within or out of a service area corresponding to the first service.

It can be understood that an implementation process of S510 may be learned with reference to relevant descriptions in the method embodiments 200 to 400. As a possible implementation, the target base station performs S520 in a case that the target base station is an enhanced base station, and the target base station performs S530 in a case that the target base station is a conventional base station. For a specific implementation process, refer to descriptions in S520 and S530.

S520. In a case that it is determined that the target base station is out of a service area corresponding to the first service, perform a second predetermined operation.

The second predetermined operation includes at least one of the following (1) to (2).

(1) Send a second indication to the source base station, where the second indication is used to indicate that handover to the first service is rejected (which may be understood as an unsuccessful handover) and/or the terminal does not belong to a service group corresponding to the first service.

An XN handover scenario is used as an example. In a case that after receiving the first indication, the target base station can determine, based on the first indication, that the target base station is out of the service area corresponding to the first service and the target base station rejects a handover of the terminal, the target base station may send a HANDOVER PREPARATION FAILURE message (that is, the second indication) to the source base station. The HANDOVER PREPARATION FAILURE message may further carry a message indicating that the terminal does not belong to the service group corresponding to the first service.

In a case that after receiving the first indication, the target base station can determine, based on the first indication, that the target base station is out of the service area corresponding to the first service and the target base station accepts a handover of the terminal to itself, the target base station may send to the source base station the second indication indicating that the terminal does not belong to the service group corresponding to the first service.

(2) Send a third indication to a core network function, where the third indication is used to indicate that the terminal does not belong to the service group corresponding to the first service.

It can be understood that when the second predetermined operation is performed, the target base station, the source base station, and the core network function all learn that the terminal is out of the service area corresponding to the first service. This guarantees the wireless communication performance.

S530. In a case that it is determined or not determined that the target base station is within or out of the service area corresponding to the first service, send a path switch request (PATH SWITCH REQUEST message) to a core network function.

The path switch request carries the service information of the first service, so that the core network function determines, based on the service information of the first service, whether the target base station is within or out of the service area corresponding to the first service. In this way, removing the terminal from the service group corresponding to the first service is triggered or not triggered.

Further, as a possible implementation, in addition to that the source base station or the target base station determines whether the target base station is within or out of the service area corresponding to the first service, if the terminal can determine whether the target base station is within or out of the service area corresponding to the first service, the terminal may send a radio resource control (RRC) message to the target base station when determining that the target base station is out of the service area corresponding to the first service. In a case that the target base station receives the RRC message from the terminal, the target base station performs at least one of the following (1) and (2) based on the RRC message:

(1) in a case that the RRC message indicates the target base station to release resource corresponding to the first service, releasing the resource corresponding to the first service; and (2) in a case that the RRC message indicates that the terminal does not belong to a service group corresponding to the first service, sending an N2 message to a core network function, where the N2 message is used to indicate that the terminal does not belong to the service group corresponding to the first service.

The target base station receives the RRC message. Therefore, it can be ensured that the terminal is removed from the service group corresponding to the first service. In addition, consistency in understanding can be ensured between the target base station and the core network function, avoiding waste of resources.

In this embodiment, whether the target base station triggers the process of removing a terminal from the service group corresponding to the first service is determined based on whether the target base station can determine whether the target base station is within or out of the service area corresponding to the first service. This further improves the flexibility of transmission switching and guarantees features of Local MBS and other first services.

Figure 6:
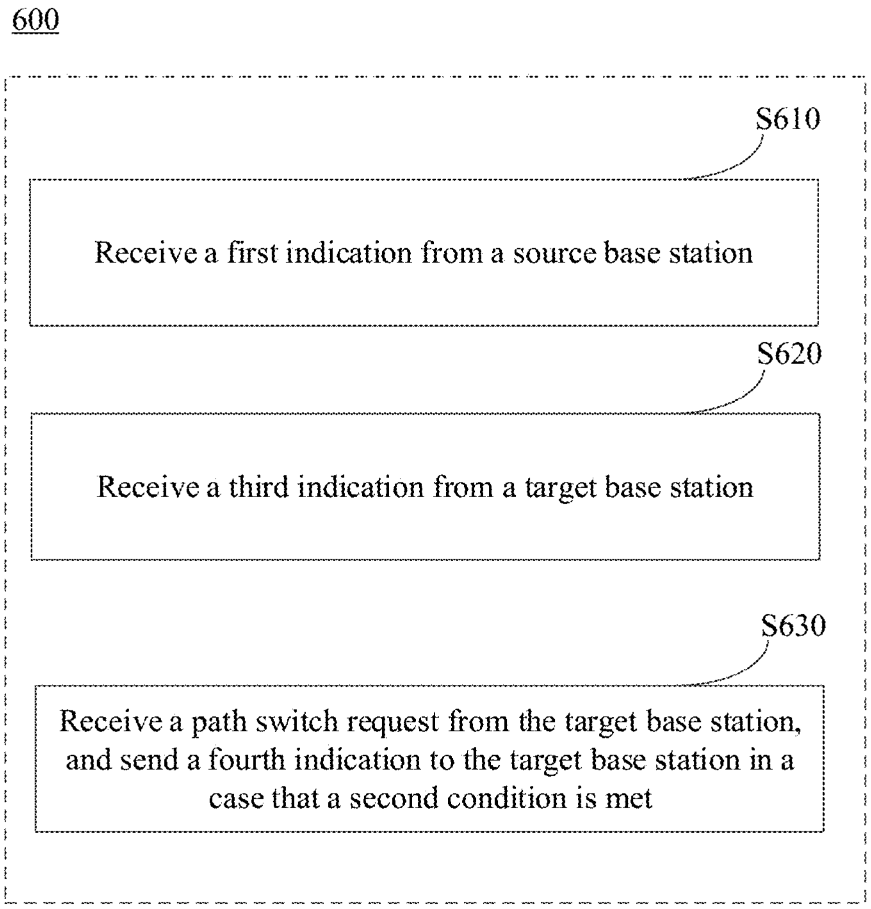
FIG. 6 is a schematic flowchart of a transmission switching method according to another example embodiment of this application.

As shown in FIG. 6, FIG. 6 is a schematic flowchart of a transmission switching method 600 according to an example embodiment of this application. The method 600 may be executed by a core network function or others, specifically hardware and/or software installed on the core network function. In this embodiment, based on different handover scenarios, the method 600 may include at least one of S610 to S630.

S610. Receive a first indication from a source base station.

The first indication is used to request a terminal to hand over from the source base station to a target base station, the first indication contains service information of a first service, and the service information of the first service is used to determine whether the target base station is within or out of a service area corresponding to the first service.

In this embodiment, an implementation process of S610 can be learned with reference to relevant descriptions in the method embodiments 200 to 500. In addition, as a possible implementation, for an N2 handover scenario, if the source base station cannot determine whether the target base station is within or out of a service area corresponding to the first service, the source base station sends to the core network function the first indication containing the service information of the first service. In this case, the core network function can determine, based on the received first indication, whether the target base station is within or out of the service area corresponding to the first service, and send a non-access stratum (NAS) message to the terminal when it is determined that the target base station is out of the service area corresponding to the first service, so as to trigger removal of the terminal from the service group corresponding to the first service. The NAS message is used to indicate that the terminal does not belong to the service group corresponding to the first service, ensuring smooth transmission switching.

Furthermore, in a case that the core network function rejects handover of the terminal (that is, unsuccessful handover), the core network function may add a PDU session identifier (session ID) of the first service to PDU Session Resources to Release List IE in a HANDOVER COMMAND message, so as to reject a handover to the first service.

As another possible implementation, for an N2 handover scenario, if the source base station can determine whether the target base station is within or out of a service area corresponding to the first service, the source base station may send to the core network function the first indication not containing the service information of the first service. In this case, both the core network function and the source base station learn about the handover of the terminal, guaranteeing the wireless communication performance.

In conclusion, a transmission switching solution provided by S610 is implemented in the N2 handover scenario, so that smooth transmission switching in the N2 handover scenario is ensured.

S620. Receive a third indication from a target base station.

The third indication is used to indicate that the terminal does not belong to a service group corresponding to the first service, and the third indication is sent in a case that the target base station receives the first indication from the source base station and that the target base station is out of the service area corresponding to the first service.

In this embodiment, an implementation process of S620 can be learned with reference to relevant descriptions in the method embodiments 200 to 500. In addition, as a possible implementation, for an XN handover scenario, if the target base station can determine that the target base station is out of a service area corresponding to the first service, the target base station may send the third indication to the core network function. In this case, the core network function can learn that the terminal does not belong to a service group corresponding to the first service, and sends a NAS message to the terminal, where the NAS message is used to indicate that the terminal does not belong to the service group corresponding to the first service.

It can be understood that whether the core network function sends or does not send the NAS message to the terminal can be stipulated by a protocol or configured by a higher layer, which is not limited herein.

S630. Receive a path switch request from the target base station, and send a fourth indication to the target base station in a case that a second condition is met.

In this embodiment, an implementation process of S630 can be learned with reference to relevant descriptions in the method embodiments 200 to 500. As a possible implementation, for an XN handover scenario, no matter whether the target base station can determine whether the target base station is within or out of a service area corresponding to the first service, the target base station may send the path switch request to the core network function. In this case, if the second condition is met, the core network function can determine whether the target base station is within or out of the service area corresponding to the first service, and sends a fourth indication to the target base station.

Optionally, the Second Condition Includes at Least One of the Following (1) and (2):

(1) the path switch request contains the service information of the first service; and (2) the target base station is out of the service area corresponding to the first service.

The Fourth Indication is Used to Indicate at Least One of the Following (1) and (2):

(1) a path switch corresponding to the first service failed (alternatively understood as that a path switch to the first service is rejected); and (2) the terminal does not belong to the service group corresponding to the first service.

In conclusion, a transmission switching solution provided by S620 and S630 is implemented in the XN handover scenario, so that smooth transmission switching in the XN handover scenario is ensured.

It should also be noted that the core network function in this embodiment may be applicable only to the N2 handover scenario (for example, performing S610), applicable only to the XN handover scenario (for example, performing S620 and/or S630), or applicable to both the N2 handover scenario and the XN handover scenario, which is not limited herein.

Optionally, in the foregoing implementation, the first service includes at least one of Local MBS and MBS.

In this embodiment, the core network function determines whether the target base station is within or out of the service area corresponding to the first service, and then it is determined whether to trigger removal of the terminal from the service group corresponding to the first service. This further improves the flexibility of transmission switching and guarantees features of Local MBS and other first services.

Figure 7:
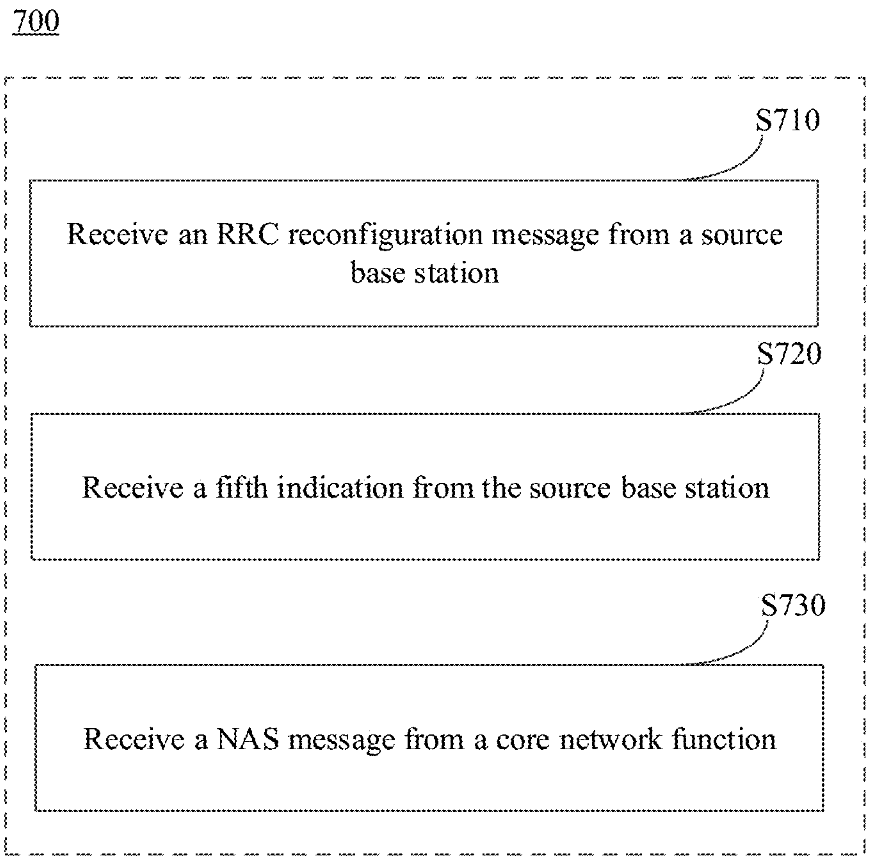
FIG. 7 is a schematic flowchart of a transmission switching method according to another example embodiment of this application.

As shown in FIG. 7, FIG. 7 is a schematic flowchart of a transmission switching method 700 according to an example embodiment of this application. The method 700 may be executed by a terminal or others, specifically hardware and/or software installed on the terminal. In this embodiment, the method 700 may include at least one of S710 to S730.

S710. Receive an RRC reconfiguration message from a source base station.

The RRC reconfiguration message is sent after the source base station sends a first indication to a network-side device, the first indication is used to request the terminal to hand over from the source base station to a target base station, the first indication contains service information of a first service, the service information of the first service is used to determine whether the target base station is within or out of a service area corresponding to the first service, and the network-side device includes the target base station and/or a core network function.

In this embodiment, as a possible implementation, in a case that the terminal determines, based on the RRC reconfiguration message, that the target base station is out of the service area corresponding to the first service, a third predetermined operation is performed. The third predetermined operation includes at least one of the following (1) and (2):

(1) sending a NAS message to the core network function, where the NAS message is used to indicate that the terminal does not belong to the service group corresponding to the first service (for example, the terminal initiates a session leave procedure); and (2) sending an RRC message to the target base station, where the RRC message is used for either of the following (2a) and (2b):

(2a) indicating the target base station to release resource corresponding to the first service; or (2b) indicating that the terminal does not belong to the service group corresponding to the first service.

It can be understood that an implementation process of S710 can be learned with reference to relevant descriptions in the method embodiments 200 to 600. In addition, in the transmission switching method provided by S710 of this embodiment, the terminal determines whether the target base station is within or out of the service area corresponding to the first service, and then removal of the terminal from the service group corresponding to the first service is triggered. In this way, the terminal is prevented from access to the first service, guaranteeing features of Local MBS and other first services.

Furthermore, the terminal also sends the NAS message and the RRC message, so that both the network-side device and the terminal learn that the target base station is out of the service area corresponding to the first service, ensuring smooth transmission switching.

S720. Receive a fifth indication from the source base station, where the fifth indication is sent in a case that the source base station determines that the target base station is out of the service area corresponding to the first service, and the fifth indication is used to indicate that the terminal does not belong to a service group corresponding to the first service.

In S720, the fifth indication is sent to the terminal in a case that the source base station determines that the target base station is out of the service area corresponding to the first service, so as to indicate that the terminal does not belong to a service group corresponding to the first service. This ensures smooth transmission switching.

S730. Receive a NAS message from the core network function, where the NAS message is used to indicate that the terminal does not belong to the service group corresponding to the first service.

In S730, the NAS message is sent to the terminal in a case that the core network function determines that the target base station is out of the service area corresponding to the first service, so as to indicate that the terminal does not belong to a service group corresponding to the first service. This ensures smooth transmission switching.

Optionally, in the foregoing implementation, the first service includes at least one of Local MBS and MBS.

It should also be understood that a transmission switching solution provided by S710 to S730 may be applicable to an N2 handover scenario or an XN handover scenario, which is not limited herein.

In this embodiment, the terminal determines whether the target base station is within or out of the service area corresponding to the first service, and then it is determined whether to trigger removal of the terminal from the service group corresponding to the first service. This further improves the flexibility of transmission switching and guarantees features of Local MBS and other first services.

Further, based on the descriptions of the method embodiments 200 to 700, the transmission switching processes in the N2 handover scenario and the XN handover scenario are further described with reference to FIG. 8 and FIG. 9 as follows.

(1) XN Handover Scenario

Figure 8:
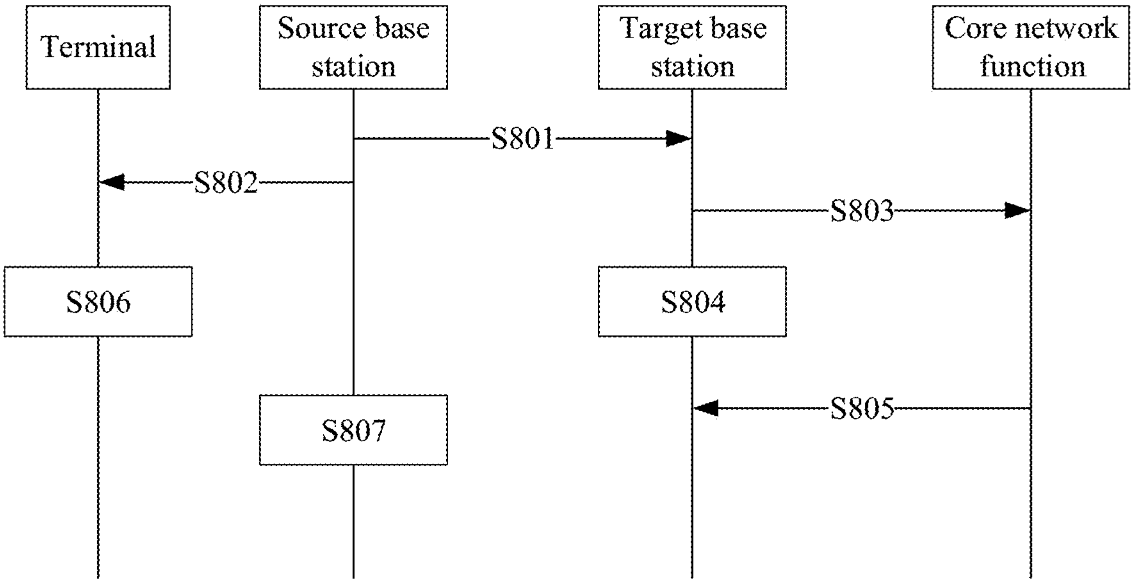
FIG. 8 is a schematic flowchart of an interaction of a transmission switching method according to an example embodiment of this application.

Referring to FIG. 8, in the XN handover scenario, a transmission switching flow 800 may include, but is not limited to, the following process.

S801. In a case that a source base station is uncertain whether a target base station is within or out of a service area corresponding to a first service, send to the target base station a first indication containing service information of the first service.

S802. Send an RRC reconfiguration message to the terminal after the first indication containing the service information of the first service is sent to the target base station.

S803. In a case that the target base station receives the first indication but it is uncertain whether the target base station is within or out of the service area corresponding to the first service, send a path switch request to a core network function.

S804. In a case that the target base station receives the first indication and it is determined that the target base station is out of the service area corresponding to the first service, perform a second predetermined operation.

S805. In a case that the core network function receives the path switch request and it is determined that the target base station is out of the service area corresponding to the first service, send a fourth indication to the target base station.

S806. In a case that the terminal receives the RRC reconfiguration message and it is determined that the target base station is out of the service area corresponding to the first service, perform a third predetermined operation.

S807. In a case that the source base station determines that the target base station is out of the service area corresponding to the first service, perform a first predetermined operation.

(2) N2 Handover Scenario

Figure 9:
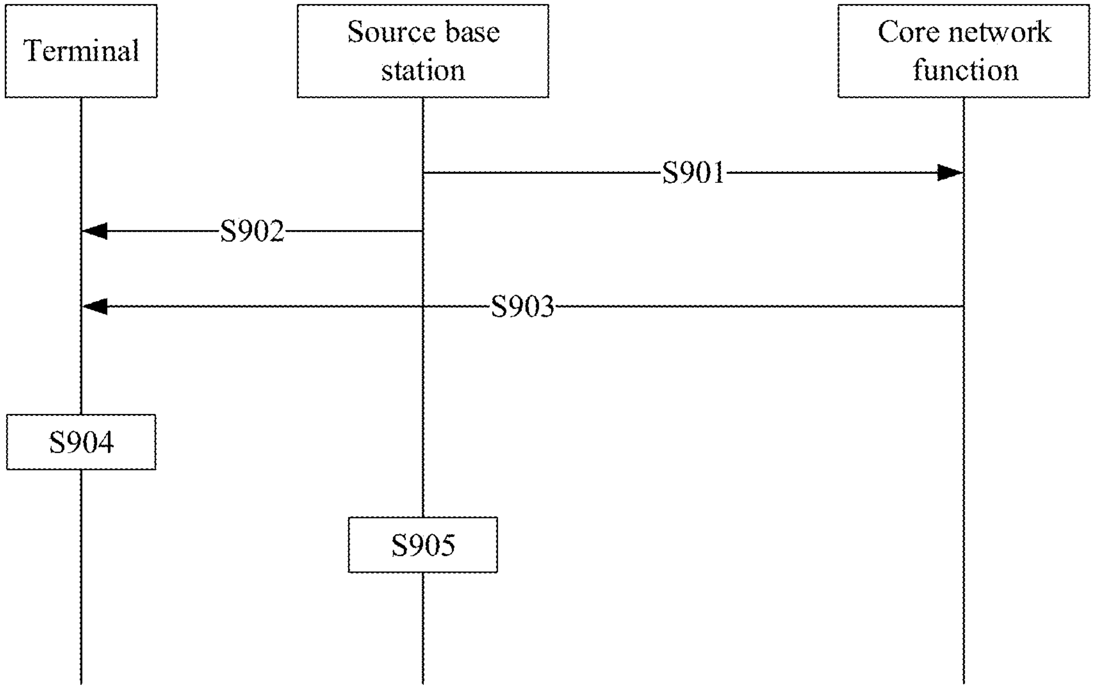
FIG. 9 is a schematic flowchart of an interaction of a transmission switching method according to another example embodiment of this application.

Referring to FIG. 9, in the N2 handover scenario, a transmission switching flow 900 may include the following process.

S901. In a case that a source base station is uncertain whether a target base station is within or out of a service area corresponding to a first service, send to a core network function a first indication containing service information of the first service.

S902. Send an RRC reconfiguration message to the terminal after the first indication containing the service information of the first service is sent to the target base station.

S903. In a case that the core network function receives the first indication and it is determined that the target base station is out of the service area corresponding to the first service, send a NAS message to the terminal.

S904. In a case that the terminal receives the RRC reconfiguration message and it is determined that the target base station is out of the service area corresponding to the first service, perform a third predetermined operation.

S905. In a case that the source base station determines that the target base station is out of the service area corresponding to the first service, perform a first predetermined operation.

It should be noted that implementation processes of S801 to S807 and S901 to S905 can be learned with reference to relevant descriptions in the method embodiments 200 to 700. To avoid repetition, details are not described herein again. In addition, the transmission switching flow 800 or 900 may include more or fewer steps, which is not limited herein.

Figure 10:
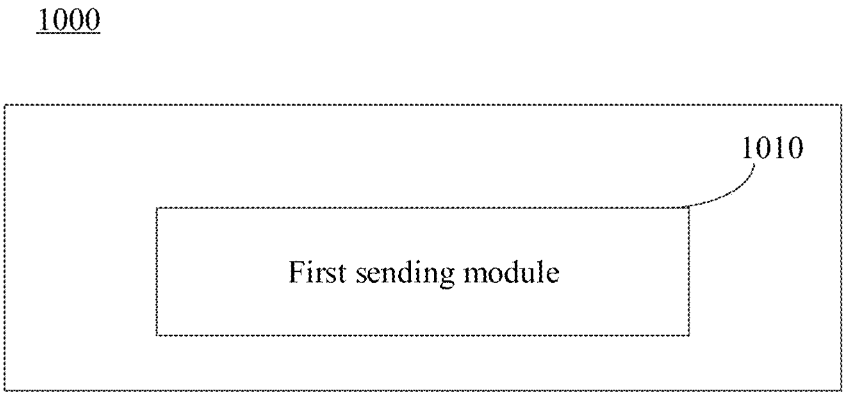
FIG. 10 is a schematic block diagram of a transmission switching apparatus according to an example embodiment of this application.

As shown in FIG. 10, FIG. 10 is a schematic block diagram of a transmission switching apparatus 1000 according to an example embodiment of this application. The transmission switching apparatus 1000 includes a first sending module 1010, configured to send a first indication to a network-side device, where the network-side device includes a target base station and/or a core network function, the first indication is used to request a terminal to hand over from the source base station to the target base station, the first indication contains service information of a first service, and the service information of the first service is used to determine whether the target base station is within or out of a service area corresponding to the first service.

Optionally, the first sending module 1010 is configured to: in a case that the source base station is uncertain whether the target base station is within or out of the service area corresponding to the first service, perform the step of sending a first indication to the target base station.

Optionally, the first sending module 1010 is further configured to: if the source base station determines that the target base station is out of the service area corresponding to the first service, perform at least one of the following: skipping sending the first indication to the network-side device; removing the service information of the first service from the first indication; and sending a fifth indication to the terminal, where the fifth indication is used to indicate that the terminal does not belong to a service group corresponding to the first service.

Optionally, the source base station is an enhanced base station.

Optionally, the first service includes at least one of Local MBS and MBS.

Figure 11:
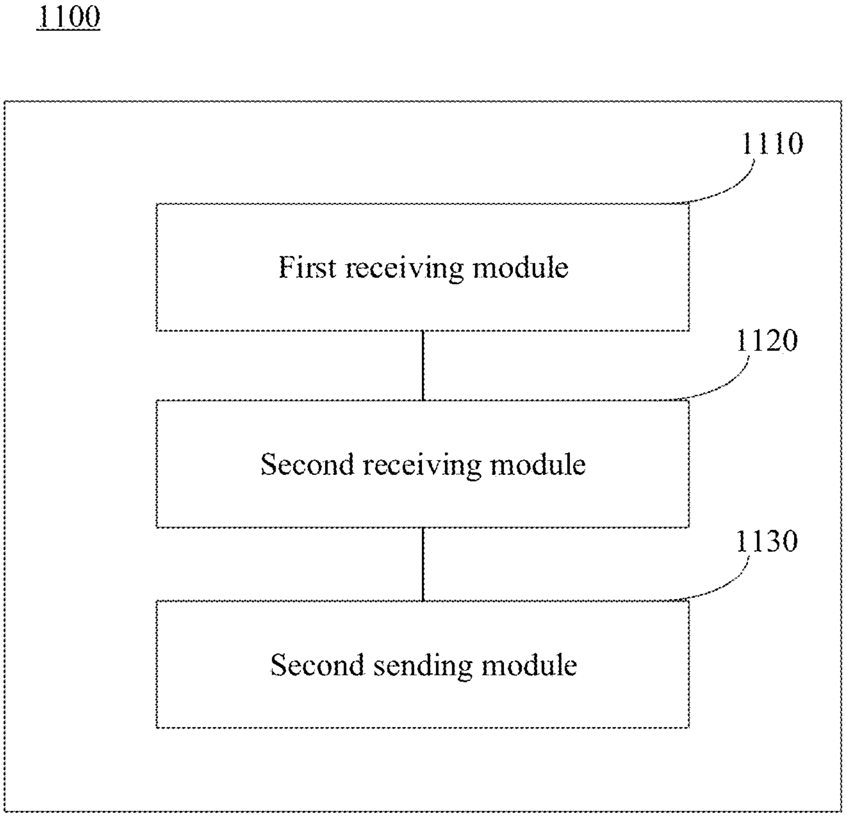
FIG. 11 is a schematic block diagram of a transmission switching apparatus according to another example embodiment of this application.

As shown in FIG. 11, FIG. 11 is a schematic block diagram of a transmission switching apparatus 1100 according to an example embodiment of this application. The transmission switching apparatus 1100 includes a first receiving module 1110, configured to receive a first indication from a source base station, where the first indication is used to request a terminal to hand over from the source base station to the target base station, the first indication contains service information of a first service, and the service information of the first service is used to determine whether the target base station is within or out of a service area corresponding to the first service.

Optionally, the apparatus 1100 further includes a second receiving module 1120 configured to: in a case that it is determined that the target base station is out of the service area corresponding to the first service, perform at least one of the following: sending a second indication to the source base station, where the second indication is used to indicate that handover to the first service is rejected and/or the terminal does not belong to a service group corresponding to the first service; and sending a third indication to a core network function, where the third indication is used to indicate that the terminal does not belong to the service group corresponding to the first service.

Optionally, the apparatus 1100 further includes a second sending module 1130, configured to send a path switch request to a core network function, where the path switch request carries the service information of the first service.

Optionally, the target base station is an enhanced base station.

Optionally, the first service includes at least one of Local MBS and MBS.

Optionally, the first receiving module 1110 is further configured to: in a case that an RRC message is received from the terminal, perform at least one of the following based on the RRC message: in a case that the RRC message indicates the target base station to release resource corresponding to the first service, releasing the resource corresponding to the first service; and in a case that the RRC message indicates that the terminal does not belong to a service group corresponding to the first service, sending an N2 message to a core network function, where the N2 message is used to indicate that the terminal does not belong to the service group corresponding to the first service.

Figure 12:
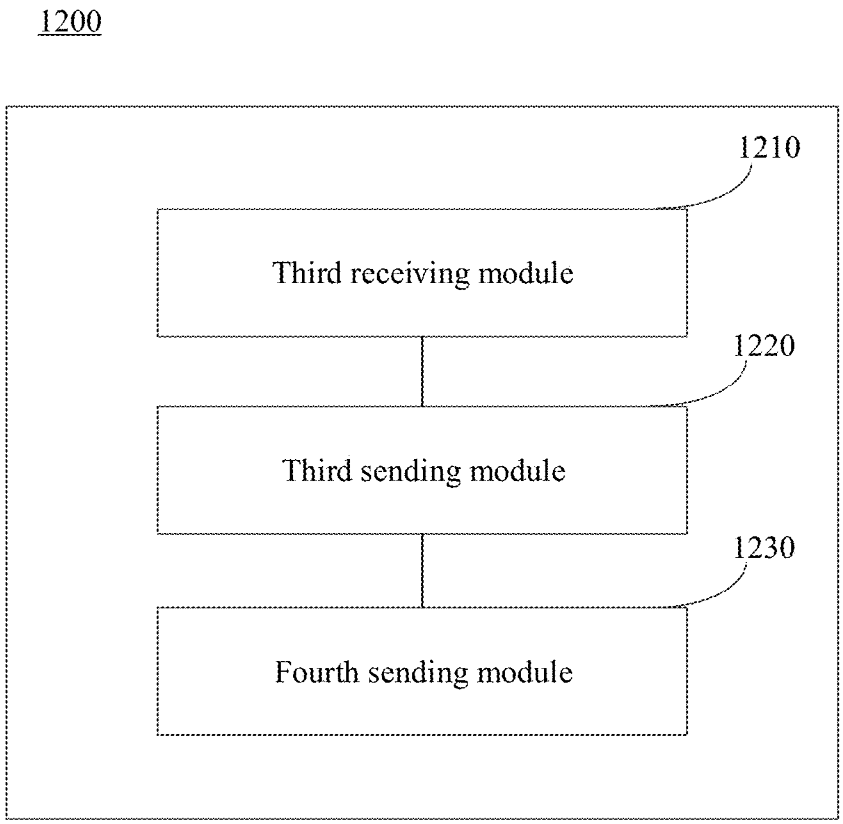
FIG. 12 is a schematic block diagram of a transmission switching apparatus according to another example embodiment of this application.

As shown in FIG. 12, FIG. 12 is a schematic block diagram of a transmission switching apparatus 1200 according to an example embodiment of this application. The transmission switching apparatus 1200 includes a third receiving module 1210 and the third receiving module 1210 is configured to perform at least one of the following: receiving a first indication from a source base station, where the first indication is used to request a terminal to hand over from the source base station to a target base station, the first indication contains service information of a first service, and the service information of the first service is used to determine whether the target base station is within or out of a service area corresponding to the first service; receiving a third indication from the target base station, where the third indication is used to indicate that the terminal does not belong to a service group corresponding to the first service, and the third indication is sent in a case that the target base station receives the first indication from the source base station and that the target base station is out of the service area corresponding to the first service; and receiving a path switch request from the target base station, and sending a fourth indication to the target base station in a case that a second condition is met; where the fourth indication is used to indicate at least one of the following: a path switch corresponding to the first service failed; and the terminal does not belong to the service group corresponding to the first service.

Optionally, the apparatus 1200 further includes a third sending module 1220 configured to: in a case that it is determined that the target base station is out of the service area of the first service, send a NAS message to the terminal, where the NAS message is used to indicate that the terminal does not belong to the service group corresponding to the first service.

Optionally, the apparatus 1200 further includes a fourth sending module 1230, configured to send or skip sending a NAS message to the terminal, where the NAS message is used to indicate that the terminal does not belong to the service group corresponding to the first service.

Optionally, the second condition includes at least one of the following: the path switch request contains the service information of the first service; and the target base station is out of the service area of the first service.

Optionally, the first service includes at least one of Local MBS and MBS.

Figure 13:
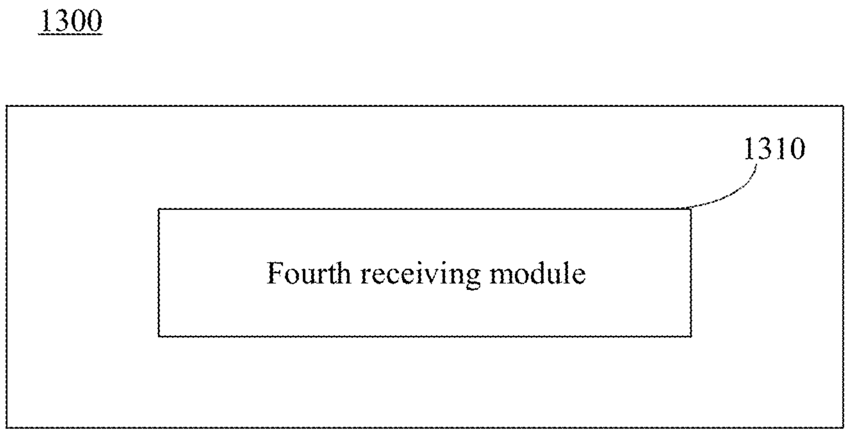
FIG. 13 is a schematic block diagram of a transmission switching apparatus according to another example embodiment of this application.

As shown in FIG. 13, FIG. 13 is a schematic block diagram of a transmission switching apparatus 1300 according to an example embodiment of this application. The transmission switching apparatus 1300 includes a fourth receiving module 1310 and the fourth receiving module 1310 is configured to perform at least one of the following: receiving an RRC reconfiguration message from a source base station, where the RRC reconfiguration message is sent after the source base station sends a first indication to a network-side device, the first indication is used to request the terminal to hand over from the source base station to a target base station, the first indication contains service information of a first service, the service information of the first service is used to determine whether the target base station is within or out of a service area corresponding to the first service, and the network-side device includes the target base station and/or a core network function; receiving a fifth indication from the source base station, where the fifth indication is sent in a case that the source base station determines that the target base station is out of the service area corresponding to the first service, and the fifth indication is used to indicate that the terminal does not belong to a service group corresponding to the first service; and receiving a NAS message from the core network function, where the NAS message is used to indicate that the terminal does not belong to the service group corresponding to the first service.

Optionally, the fourth receiving module 1310 is further configured to: in a case that it is determined, based on the RRC reconfiguration message, that the target base station is out of the service area corresponding to the first service, perform at least one of the following: sending a NAS message to the core network function, where the NAS message is used to indicate that the terminal does not belong to the service group corresponding to the first service; and sending an RRC message to the target base station, where the RRC message is used for either of the following: indicating the target base station to release resource corresponding to the first service; or indicating that the terminal does not belong to the service group corresponding to the first service.

Optionally, the first service includes at least one of Local MBS and MBS.

It should be noted that the transmission switching methods 200 to 900 provided in embodiments of this application may be performed by a transmission switching apparatus or a control module for performing the transmission switching method in the transmission switching apparatus. In this embodiment of this application, the transmission switching apparatus according to this embodiment of this application is described by using an example in which the transmission switching apparatus performs the transmission switching method.

The transmission switching apparatus in this embodiment of this application may be an apparatus or electronic device with an operating system, or may be a component, an integrated circuit, or a chip of a terminal. The apparatus or electronic device may be a mobile terminal or a non-mobile terminal. For example, the mobile terminal may include but is not limited to a type of the foregoing terminal 11, and the non-mobile terminal may be a server, a network attached storage (NAS), a personal computer (PC), a television (TV), a teller machine, a self-service machine, or the like. This is not specifically limited in the embodiments of this application.

The transmission switching apparatus provided in this embodiment of this application can implement the processes implemented by the method embodiments illustrated in FIG. 2 to FIG. 9, with the same technical effects achieved. To avoid repetition, details are not described herein again.

Figure 14:
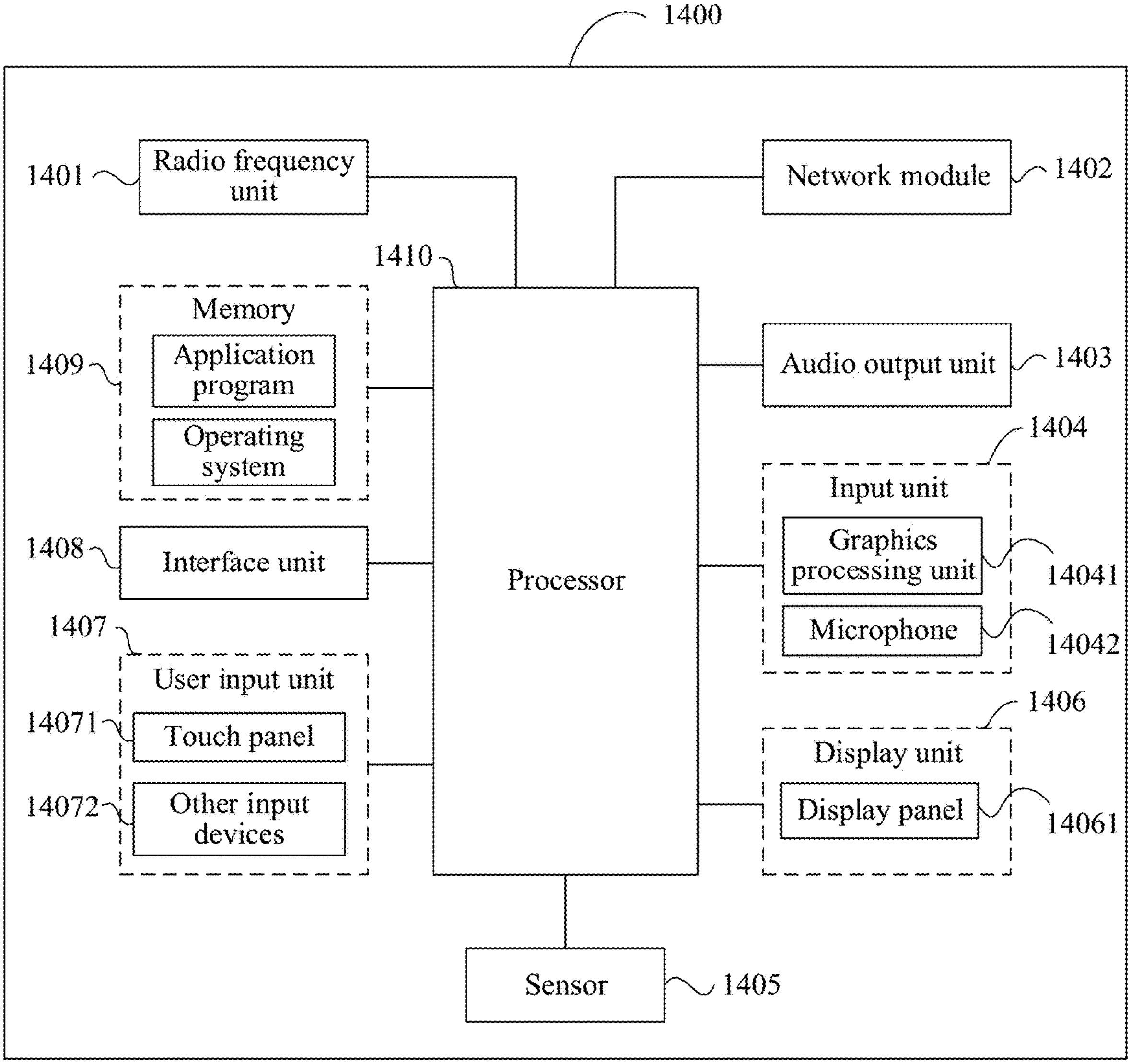
FIG. 14 is a schematic block diagram of a terminal according to an example embodiment of this application.

An embodiment of this application further provides a terminal, including a processor and a communication interface, where the communication interface is coupled to the processor, and the processor is configured to run a program or instructions to implement the method according to the method embodiment 700. The terminal embodiment is corresponding to the foregoing method embodiments used on the terminal side. All the implementation processes and implementation methods of the foregoing method embodiments can be applied to the terminal embodiment, with the same technical effects achieved. Specifically, FIG. 14 is a schematic diagram of a hardware structure of a terminal implementing the embodiments of this application.

A terminal 1400 includes but is not limited to at least some components of a radio frequency unit 1401, a network module 1402, an audio output unit 1403, an input unit 1404, a sensor 1405, a display unit 1406, a user input unit 1407, an interface unit 1408, a memory 1409, and a processor 1410.

Persons skilled in the art can understand that the terminal 1400 may further include a power source (for example, a battery) for supplying power to the components. The power source may be logically connected to the processor 1410 through a power management system. In this way, functions such as charge management, discharge management, and power consumption management are implemented by using the power management system. The structure of the terminal shown in FIG. 14 does not constitute a limitation on the terminal. The terminal may include more or fewer components than illustrated in the figure, or combine some components, or have a different component arrangement. Details are not described again herein.

It should be understood that in the embodiments of this application, the input unit 1404 may include a graphics processing unit (GPU) 14041 and a microphone 14042. The graphics processing unit 14041 processes image data of a static picture or a video that is obtained by an image capture apparatus (for example, a camera) in a video capture mode or an image capture mode. The display unit 1406 may include a display panel 14061. The display panel 14061 may be configured in a form of a liquid crystal display, an organic light-emitting diode, or the like. The user input unit 1407 includes a touch panel 14071 and other input devices 14072. The touch panel 14071 is also referred to as a touchscreen. The touch panel 14071 may include two parts: a touch detection apparatus and a touch controller. The other input devices 14072 may include but are not limited to a physical keyboard, a functional button (such as a volume control button or a power on/off button), a trackball, a mouse, and a joystick. Details are not described again herein.

In the embodiments of this application, the radio frequency circuit 1401 receives downlink data from the network-side device for processing by the processor 1410, and sends uplink data to the network-side device. Generally, the radio frequency unit 1401 includes but is not limited to an antenna, at least one amplifier, a transceiver, a coupler, a low noise amplifier, a duplexer, and the like.

The memory 1409 may be configured to store software programs or instructions, and various data. The memory 1409 may mainly include a program or instruction storage area and a data storage area. The program or instruction storage area may store an operating system, an application program or instructions required by at least one function (for example, an audio playing function and an image playing function), and the like. In addition, the memory 1409 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another volatile solid-state storage device.

The processor 1410 may include one or more processing units. Optionally, the processor 1410 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 1410.

The processor 1410 is used to perform at least one of the following: receiving an RRC reconfiguration message from a source base station, where the RRC reconfiguration message is sent after the source base station sends a first indication to a network-side device, the first indication is used to request the terminal to hand over from the source base station to a target base station, the first indication contains service information of a first service, the service information of the first service is used to determine whether the target base station is within or out of a service area corresponding to the first service, and the network-side device includes the target base station and/or a core network function; receiving a fifth indication from the source base station, where the fifth indication is sent in a case that the source base station determines that the target base station is out of the service area corresponding to the first service, and the fifth indication is used to indicate that the terminal does not belong to a service group corresponding to the first service; and receiving a NAS message from the core network function, where the NAS message is used to indicate that the terminal does not belong to the service group corresponding to the first service.

Optionally, in a case that it is determined, based on the RRC reconfiguration message, that the target base station is out of the service area corresponding to the first service, the processor 1410 performs at least one of the following: sending a NAS message to the core network function, where the NAS message is used to indicate that the terminal does not belong to the service group corresponding to the first service; and sending an RRC message to the target base station, where the RRC message is used for either of the following: indicating the target base station to release resource corresponding to the first service; or indicating that the terminal does not belong to the service group corresponding to the first service.

Optionally, the first service includes at least one of Local MBS and MBS.

In this embodiment, a terminal determines, based on the received RRC reconfiguration message, whether the target base station is within or out of a service area corresponding to the first service. In this case, when the terminal leaves a local service area corresponding to the first service, it can be effectively triggered that the terminal is removed from a service group corresponding to the first service, and the first service is unavailable to the terminal, which guarantees features of Local MBS and other first services.

An embodiment of this application further provides a network-side device, including a processor and a communication interface, where the communication interface is coupled to the processor, and the processor is configured to run a program or instructions to implement the methods according to the method embodiments 200 to 600. The network-side device embodiment is corresponding to the foregoing method embodiments applied to the network-side device. All the implementation processes and implementation methods of the foregoing method embodiments can be applied to the network-side device embodiment, with the same technical effects achieved.

Figure 15:
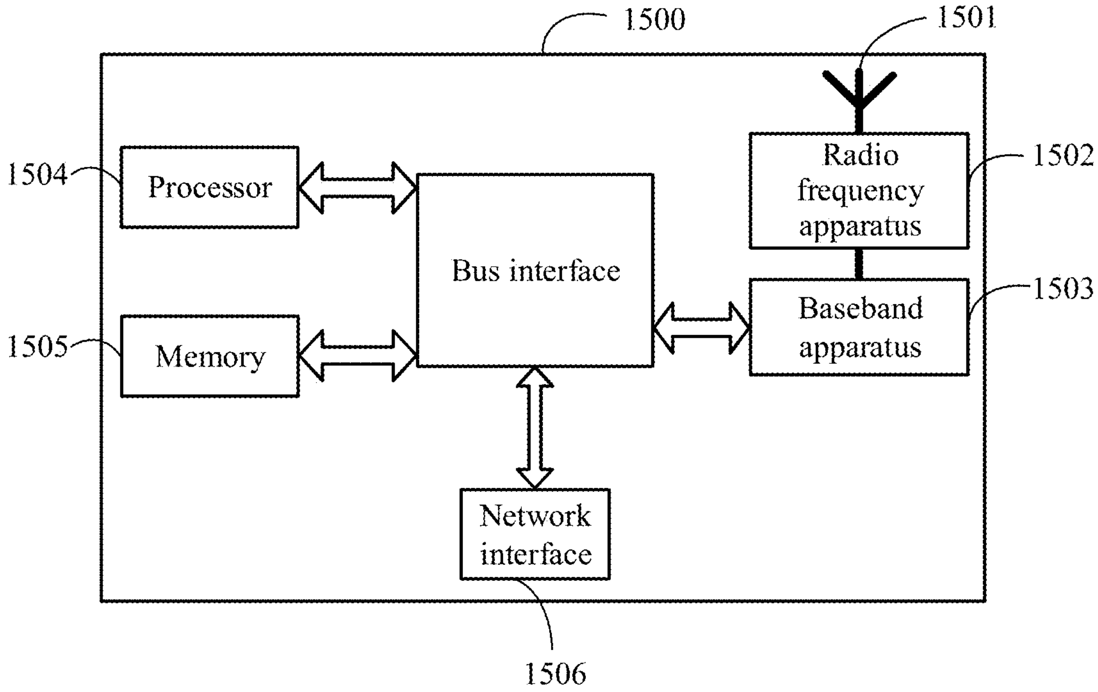
FIG. 15 is a schematic block diagram of a network-side device according to an example embodiment of this application.

Specifically, an embodiment of this application further provides a network-side device. As shown in FIG. 15, the network device 1500 includes an antenna 1501, a radio frequency apparatus 1502, and a baseband apparatus 1503. The antenna 1501 is connected to the radio frequency apparatus 1502. In an uplink direction, the radio frequency apparatus 1502 receives information by using the antenna 1501, and transmits the received information to the baseband apparatus 1503 for processing. In a downlink direction, the baseband apparatus 1503 processes to-be-transmitted information, and transmits the information to the radio frequency apparatus 1502; and the radio frequency apparatus 1502 processes the received information and then transmits the information by using the antenna 1501.

The foregoing frequency band processing apparatus may be located in the baseband apparatus 1503. The method performed by the network-side device in the foregoing embodiment may be implemented by the baseband apparatus 1503, and the baseband apparatus 1503 includes a processor 1504 and a memory 1505.

The baseband apparatus 1503 may include, for example, at least one baseband processing unit, where a plurality of chips are disposed on the baseband processing unit. As shown in FIG. 15, one of the chips is, for example, the processor 1504, and connected to the memory 1505, to invoke a program in the memory 1505 to perform the operations of the network device shown in the foregoing method embodiment.

The baseband apparatus 1503 may further include a network interface 1506, configured to exchange information with the radio frequency apparatus 1502, where the interface is, for example, a common public radio interface (CPRI).

Specifically, the network-side device according to the embodiment of the present invention further includes instructions or a program stored in the memory 1505 and capable of running on the processor 1504. The processor 1504 invokes the instructions or program in the memory 1505 to implement the method performed by each module shown in FIG. 10 to FIG. 12, and the same technical effects are achieved. To avoid repetition, details are not described herein again.

An embodiment of this application further provides a readable storage medium, where the readable storage medium stores a program or instructions, and when the program or instructions are executed by a processor, the processes of the foregoing embodiments 200 to 700 of the transmission switching method are implemented, with the same technical effects achieved. To avoid repetition, details are not described herein again.

The processor is the processor in the terminal in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions on the network-side device to implement the processes of the foregoing embodiments of the transmission switching method, with the same technical effects achieved. To avoid repetition, details are not described herein again.

It should be understood that the chip mentioned in this embodiment of this application may also be referred to as a system-level chip, a system chip, a chip system, a system-on-chip, or the like.

Optionally, an embodiment of this application further provides a computer program product, including a processor, a memory, and a program or instructions stored in the memory and capable of running on the processor. When the program or instructions are executed by the processor, the processes of the foregoing embodiments of the transmission switching method are implemented, with the same technical effects achieved. To avoid repetition, details are not described herein again.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A transmission switching method, wherein the method comprises:

sending, by a source base station, a first indication to a network-side device, wherein the network-side device comprises a target base station;

wherein the first indication is used to request a wireless terminal to hand over from the source base station to the target base station, the first indication contains service information of a first service, and the service information of the first service is used for the target base station to determine whether the target base station is within or out of a service area corresponding to the first service;

wherein after the target base station receives the first indication from the source base station, the method further comprises:

when the target base station receives a radio resource control (RRC) message sent by the wireless terminal after the wireless terminal generates the RRC message and when the wireless terminal determines that the target base station is out of the service area corresponding to the first service, the target base station performing at least one of the following based on the RRC message:

when the RRC message indicates the target base station to release resource corresponding to the first service, releasing the resource corresponding to the first service; and when the RRC message indicates that the wireless terminal does not belong to a service group corresponding to the first service, sending an N2 message to a core network function, wherein the N2 message is used to indicate that the wireless terminal does not belong to the service group corresponding to the first service;

wherein the first service comprises local multimedia broadcast and multicast service (Local MBS), or comprises the Local MBS and MBS;

wherein the core network function comprises an access and mobility management function (AMF).

2. The method according to claim 1, wherein the method further comprises:

when the source base station is uncertain whether the target base station is within or out of the service area corresponding to the first service, the source base station performing the step of sending a first indication to the target base station.

3. The method according to claim 1, wherein before the performing the step of sending, by a source base station, a first indication to a network-side device, the method further comprises:

when the source base station determines that the target base station is out of the service area corresponding to the first service, the source base station performing at least one of the following:

determining not to send the first indication to the network-side device;

removing the service information of the first service from the first indication; and sending a fifth indication to the wireless terminal, wherein the fifth indication is used to indicate that the wireless terminal does not belong to a service group corresponding to the first service.

4. The method according to claim 3, wherein the source base station is an enhanced base station.

5. The method according to claim 1, wherein after the step of receiving, by the target base station, the first indication from the source base station, the method further comprises:

when it is determined that the target base station is out of the service area corresponding to the first service, the target base station performing at least one of the following:

sending a second indication to the source base station, wherein the second indication is used to indicate that handover to the first service is rejected and/or the wireless terminal does not belong to a service group corresponding to the first service; and sending a third indication to a core network function, wherein the third indication is used to indicate that the wireless terminal does not belong to the service group corresponding to the first service.

6. The method according to claim 1, wherein after the step of receiving, by the target base station, the first indication from the source base station, the method further comprises:

the target base station sending a path switch request to a core network function, wherein the path switch request carries the service information of the first service.

7. The method according to claim 1, wherein the target base station is an enhanced base station.

8. A transmission switching method, wherein the method comprises:

receiving, by a core network function, a first indication from a source base station, wherein the first indication is used to request a wireless terminal to hand over from the source base station to a target base station, the first indication contains service information of a first service, and the service information of the first service is used for the core network function to determine whether the target base station is within or out of a service area corresponding to the first service;

wherein after the step of receiving, by a core network function, a first indication from a source base station, the method further comprises:

when it is determined that the target base station is out of the service area corresponding to the first service, generating and sending, by the core network function, a non-access stratum (NAS) message to the wireless terminal, wherein the NAS message is used to indicate that the wireless terminal does not belong to the service group corresponding to the first service;

wherein the first service comprises local multimedia broadcast and multicast service (Local MBS), or comprises the Local MBS and MBS;

wherein the core network function comprises an access and mobility management function (AMF).

9. The method according to claim 8, wherein after the step of receiving, by the core network function, a third indication from the target base station, the method further comprises:

sending or determining not to send, by the core network function, a NAS message to the wireless terminal, wherein the NAS message is used to indicate that the wireless terminal does not belong to the service group corresponding to the first service.

10. The method according to claim 8, wherein the second condition comprises:

the path switch request contains the service information of the first service; and the target base station is out of the service area corresponding to the first service.

11. The method according to claim 8, wherein, when the core network function rejects handover of the wireless terminal, the core network function add a PDU session identifier (session ID) of the first service in a handover command message.

12. A transmission switching method, wherein the method comprises:

receiving, by a wireless terminal, a radio resource control (RRC) reconfiguration message from a source base station, wherein the RRC reconfiguration message is sent after the source base station sends a first indication to a network-side device, the first indication is used to request the wireless terminal to hand over from the source base station to a target base station, the first indication contains service information of a first service, the service information of the first service is used for the wireless terminal to determine whether the target base station is within or out of a service area corresponding to the first service, and the network-side device comprises the target base station;

wherein after the step of receiving, by a wireless terminal, an RRC reconfiguration message from a source base station, the method further comprises:

when it is determined, based on the RRC reconfiguration message, that the target base station is out of the service area corresponding to the first service, the wireless terminal performing at least one of the following:

generating and sending a NAS message to a core network function, wherein the NAS message is used to indicate that the wireless terminal does not belong to the service group corresponding to the first service; and generating and sending an RRC message to the target base station, wherein the RRC message is used for either of the following:

indicating the target base station to release resource corresponding to the first service; and indicating that the wireless terminal does not belong to the service group corresponding to the first service;

wherein the first service comprises local multimedia broadcast and multicast service (Local MBS), or comprises the Local MBS and MBS;

wherein the core network function comprises an access and mobility management function (AMF).

* * * * *